United States Patent [19]

Cebollero

[11] Patent Number: 4,773,699
[45] Date of Patent: Sep. 27, 1988

[54] SUN SHADE FOR AUTOMOTIVE VEHICLES

[75] Inventor: Carlos G. Cebollero, Barcelona, Spain

[73] Assignee: Industrias Techno-Matic S.A., Barcelona, Spain

[21] Appl. No.: 19,525

[22] Filed: Feb. 26, 1987

[30] Foreign Application Priority Data

Mar. 1, 1986 [ES] Spain ................................. 292646

[51] Int. Cl.$^4$ .............................................. B60J 3/02
[52] U.S. Cl. .................................... 296/97.1; 296/97.5
[58] Field of Search ................. 296/97 H, 97 R, 97 K

[56] References Cited

U.S. PATENT DOCUMENTS

| 3,542,416 | 11/1970 | Nelson | 296/97 H |
| 3,751,106 | 8/1973 | Mahler et al. | 296/97 H |
| 4,521,046 | 6/1985 | Foggini | 296/97 K |
| 4,626,019 | 12/1986 | Tung et al. | 296/97 H |

Primary Examiner—Robert R. Song
Attorney, Agent, or Firm—Michael J. Striker

[57] ABSTRACT

A sun shade for automotive vehicles, comprises a body of a solid polyurethane foam and having an external surface, a rigid, one-piece sheathing which covers the external surface of the body, and a thin flexible sheath which covers from outside both the body and the rigid sheathing.

8 Claims, 1 Drawing Sheet

SUN SHADE FOR AUTOMOTIVE VEHICLES

BACKGROUND OF THE INVENTION

The present invention relates to a new sun shade for automotive vehicles.

Sun shades for automotive vehicles are known and widely used. They have a variety of different constructions and are composed of a variety of different materials. The known sun shades can be improved in the sense of facilitation of their manufacture, simplification of their construction, reduction of their weight and the like. It is therefore believed that new sun shades for automotive vehicles which are concerned with the above characteristics can be proposed.

SUMMARY OF THE INVENTION

Accordingly, it is an object of the present invention to provide a sun shade for automotive vehicles which avoids the disadvantages of the prior art.

In keeping with these objects and with others which will become apparent hereinafter, one feature of the present invention resides, briefly stated, in a sun shade which has a completely solid body composed of a foam material, for example internally composed of polyurethane foam, a rigid one-piece sheathing arranged on the outer surface of the body and composed for example of hardened polyethylene, and a thin flexible outer sheath surrounding the whole assembly and composed for example of a flexible laminar polyvinylchloride.

When the sun shade is designed in accordance with the present invention, it has an extraordinarily practical efficiency in its dynamics of use, primarily because of its very low weight. The sun shade also has an optimum safety in that under no circumstances can it cause injuries in the case of accident. The new sun shade is superior from the standpoint of industrial performance in that its manufacturing costs are lower than the cost of known sun shades provided with a greater number of components and equipped with complex hinge mechanisms.

In accordance with another feature of the present invention, the sun shade has a supplementary portion of a rigid plastic which is mechanically joined to one of its ends, near a vertex, and a housing or cavity formed for directly receiving a supporting shaft retainable for example by means of a special spring.

Still a further feature of the present invention is that the sun shade can be equipped on either of its sides with a suitably assembled or attached mirror, in addition to the above mentioned structural parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
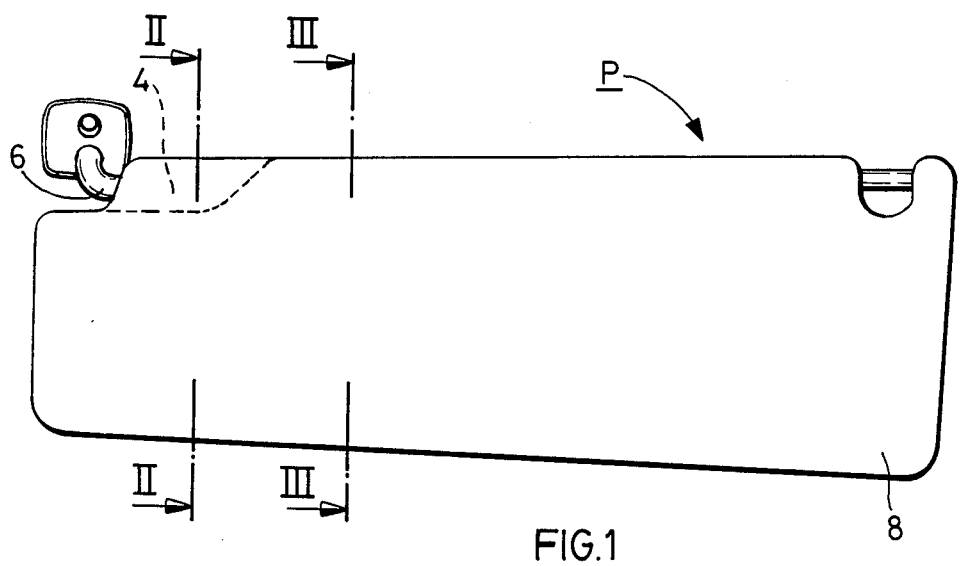
FIG. 1 is a front view of a sun shade for automotive vehicles, in accordance with the present invention.

A sun shade for automotive vehicles in accordance with the present invention is identified as a whole with reference P. The inventive sun shade has a body 1 which can be composed of polyurethane foam and occupies the great part of the width, height, and length of the sun shade. Therefore, the body 1 is solid and structure is extremely simple.

The above mentioned body 1 has an external surface which is covered by a one-piece rigid sheathing 2. The rigid sheathing 2 can be composed of plastic, such as for example a hard polyethylene.

The sun shade in accordance with the present invention also has a supplementary portion 3 which can be composed of rigid plastic, such as for example a hard polyurethane as well. The supplementary portion 3 is attached to the body 1 by means of any mounting means, such as for example an assembly unit 4 shown in FIG. 2. More particularly, the body 1 has a dove-tail shaped projection, while the supplementary portion 3 has a complementary dove-tail shaped groove in which the above projection engages.

The supplementary portion 3 is connected with the body 1 at one of its end, and more particularly near a vertex. It forms a housing or a cavity 5 for receiving a supporting shaft 6 of the inventive sun shade. A spring 7 retains the supporting shaft 6 inside the cavity 5 to insure the support for the sun shade.

The sun shade in accordance with the present invention is further provided with a thin flexible outer sheath which surrounds the body 1 and the supplementary portion 3, as well as the rigid sheathing 2. The sheath 8 is a thin laminar sheath which can be formed of polyvinylchloride, and imparts the whole assembly a perfectly unitary structure.

Figures 2, 3, 4:
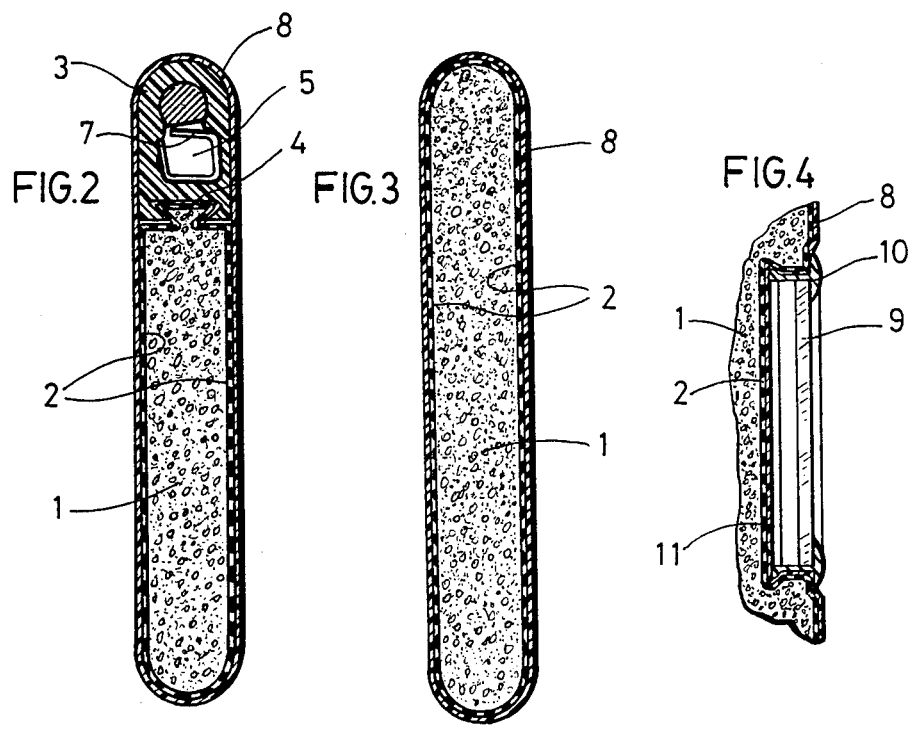
FIG. 2 is a view showing a cross section taken along the line II—II in FIG. 1.
FIG. 3 is a view showing a cross section taken along the line III—III.
FIG. 4 is a view showing the sun shade in accordance with the present invention, provided with a mirror which is attached to the body of the sun shade.

As shown in FIG. 2, the sun shade in accordance with the present invention can be provided with a mirror, at least on its one side. For this purpose the body 1 is provided with a housing or cavity identified with reference numeral 11. The cavity 11 receives a frame 10 of the mirror. The mirror itself is identified with reference numeral 9 and arranged in the frame 10 which, in turn, is retained in the cavity 11 of the body 1.

It will be understood that each of the elements described above, or two or more together, may also find a useful application in other types of constructions differing from the types described above.

While the invention has been illustrated and described as embodied in a sun shade for automotive vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A sun shade for automotive vehicles, comprising a body of a solid polyurethane foam and having an external surface and two upper ends with a vertex; a rigid, one-piece sheathing which covers said external surface of said body; a thin flexible sheath which covers from outside both said body and said rigid sheathing to impart a unitary structure to the sun shade; and a supplementary portion connected to one of said ends of said body near said vertex, said body and said supplementary portion having dove-tailed shaped projection and groove interengaging with one another.

2. A sun shade as defined in claim 1, wherein said body is composed of a completely solid, integral polyurethane foam.

3. A sun shade as defined in claim 1, wherein said rigid sheathing is composed of hardened polyethylene.

4. A sun shade as defined in claim 1, wherein said thin flexible sheath is formed as a laminar sheath of polyvinyl chloride.

5. A sun shade as defined in claim 1, wherein said supplementary portion is composed of a rigid plastic.

6. A sun shade as defined in claim 1, wherein said supplementary portion is provided with a receiving formation; and further comprising a supporting shaft arranged in said receiving formation of said supplementary portion; and means for retaining said supporting shaft in said receiving formation.

7. A sun shade as defined in claim 6, wherein said retaining means includes a spring arranged to retain said supporting shaft in said retaining formation of said supplementary portion.

8. A sun shade as defined in claim 1, wherein said body has two sides; and further comprising a mirror arranged on at least one of said sides of said body.

* * * * *